(12) United States Patent
Pearson et al.

(10) Patent No.: US 9,319,533 B2
(45) Date of Patent: Apr. 19, 2016

(54) SYSTEM AND METHOD OF TELEPHONE INPUT FOR ALARM EVENTS

(75) Inventors: Charles Pearson, Northford, CT (US); Jonathan W. Leach, Killingworth, CT (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1961 days.

(21) Appl. No.: 12/129,163

(22) Filed: May 29, 2008

(65) Prior Publication Data

US 2009/0296897 A1 Dec. 3, 2009

(51) Int. Cl.
*H04M 11/04* (2006.01)
*G08B 25/01* (2006.01)
*G08B 25/08* (2006.01)

(52) U.S. Cl.
CPC ............ *H04M 11/04* (2013.01); *G08B 25/012* (2013.01); *G08B 25/08* (2013.01)

(58) Field of Classification Search
CPC ........ G08B 17/10; G08B 25/009; G08B 1/08;
G08B 7/062; G08B 19/00; G08B 29/145;
G08B 17/00; G08B 3/10; G08B 7/066;
G08B 25/006; G08B 25/008; G08B 29/14;
G08B 7/06; G08B 13/19656; G08B 13/19663;
G08B 13/19669; G08B 13/19684; A61B
5/6843; A61B 5/0002; A61B 1/00016; H04W
48/04; H04W 4/22; H04W 76/007; H04W
8/22; H04M 11/04; H04M 11/02; H04M
1/72577; H04M 2242/04; H04M 1/663

USPC .................. 379/36–51, 102.06, 114.15, 188, 379/220.01, 258, 88.12; 455/404.1, 521, 455/404.2, 414.1, 456.1, 456.4, 574, 405, 455/410, 425; 340/501, 506, 541, 545.1, 340/32.01, 37–51, 100.05, 188
See application file for complete search history.

(56) References Cited

U.S. PATENT DOCUMENTS

| | | | | |
|---|---|---|---|---|
| 5,629,687 | A * | 5/1997 | Sutton et al. | 340/6.11 |
| 6,061,430 | A * | 5/2000 | Miller | H04Q 3/0029 379/207.16 |
| 6,263,311 | B1 * | 7/2001 | Dildy | 704/273 |
| 6,442,241 | B1 * | 8/2002 | Tsumpes | 379/45 |
| 6,643,355 | B1 * | 11/2003 | Tsumpes | H04L 12/66 379/37 |
| 6,973,166 | B1 * | 12/2005 | Tsumpes | H04L 12/2854 379/37 |
| 7,719,407 | B2 * | 5/2010 | Pearson et al. | 340/286.05 |
| 2008/0191857 | A1 * | 8/2008 | Mojaver | G08B 25/005 340/500 |
| 2008/0311879 | A1 * | 12/2008 | Martin et al. | 455/404.1 |

* cited by examiner

*Primary Examiner* — Akelaw Teshale
(74) *Attorney, Agent, or Firm* — Husch Blackwell LLP

(57) ABSTRACT

An interface between a telephone-type communications system and a regional ambient condition monitoring system receives incoming verbal status information relative to the region. That information can be transferred to the monitoring system. Verbal messages can be fed back to the communications systems to provide information as to responding to conditions in the region being monitored.

20 Claims, 2 Drawing Sheets

SYSTEM AND METHOD OF TELEPHONE INPUT FOR ALARM EVENTS

FIELD

The invention pertains to ambient condition monitoring systems. More particularly, the invention pertains to such systems which incorporate a telephone input port for receipt of alarm related information.

BACKGROUND

Various configurations of monitoring systems are known. One type, fire alarm systems, incorporates a variety of sensors, or detectors to monitor a region for fire indicators such as smoke, heat or flame. Preferably, the sooner a determination of an emergency can be made the better, subject to minimizing false alarms.

The sooner information as to location and nature of an emergency can be entered into or provided to such systems the more likely first responders, such as firefighters will be dispatched to the most appropriate location.

There is thus a continuing need to provide as much information from as many different sources as possible to such systems. Preferably input from regional communications systems could be obtained in addition to information from traditional sources such as fire detectors, or pull stations.

DETAILED DESCRIPTION

Figure 1:
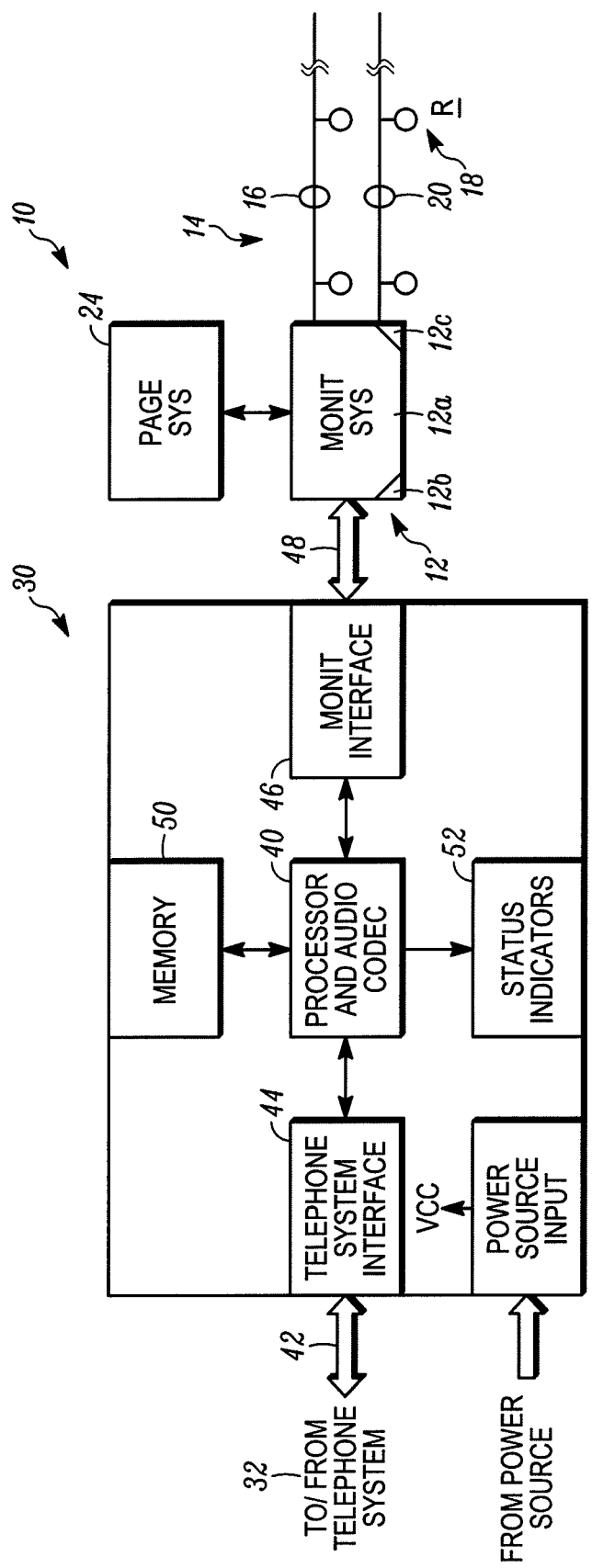
FIG. 1 is a block diagram of a system which embodies the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of the invention meet the need by providing a communications interface between a telephone system and a fire panel, or ambient condition monitoring system which could include an HVAC system, a security system, or an illumination control system. Preferably, such embodiments would be able to recognize the phone number and/or extension being used. This provides a capability for various features, some of which are described below.

An ability to report a fire, medical, or other emergency from a telephone, rather than at a pull station or other specialized device can shorten the time between alarm condition detection and reporting. The system could then carry out a database lookup against the phone being used to direct the proper response to the exact location of the emergency.

A capability can be provided to request system status information by phone, such as troubles and alarms, and their locations in the installation or region being monitored.

In one aspect of the invention, the alarm system can be used for general or emergency audio paging without a special input. In addition, a regular phone can be used as an input to the firefighters' telephone system.

In yet another aspect, access can be allowed, denied, or modified based on the telephone number calling into the alarm system. For example, the fire department may be granted access to all functions, with other outside phones denied access of any kind. Phones inside a facility may be limited to emergency reporting, except for facilities management which could be able to also have access to system status information.

In other embodiments, a language can be selected in which to receive instructions. Optionally, a language can be assigned to an extension or phone number.

Emergency information, such as evacuation routes, can be provided to a caller based on his or her extension number. Embodiments of the invention can be implemented as an optional module or as an integral part of a telephone and alarm system.

The system can monitor itself and the phone system for integrity and report status periodically to the host. When an incoming call is detected, the telephone interface could identify the calling source and compare it to allowed sources. If not an allowed source, the call would not be answered, or terminated, or routed to a dummy extension to prevent nuisance calls from interfering with the system. If the call is from an allowed source, the call would be answered and an option list could be reported to the caller based on authorization granted to the incoming phone number. Embodiments of the invention could then transfer information to and from the alarm system based on the allowed option selected.

For example, if an emergency were to be reported, an automated source could verbally request input from the reporting party as to the nature of the emergency. Information as to the emergency, that had been verbally obtained, could then be transferred to the host alarm system to be reported as an alarm of the type specified. An optional lookup table of phone numbers could provide more specific location information of the emergency. This information could be contained in either the host or the interface. If the monitoring or fire detection system is connected to an audio system, such as a public address or announcement system, that audio system could then output emergency information directing first responders or safety officials to the site of the emergency. Embodiments of the invention could also dial out on the same phone line to a building's paging system, using prerecorded messages to announce the emergency.

FIG. 1 is a block diagram of a system 10 which embodies the invention. System 10 includes an ambient condition monitoring system 12, which could be implemented as a fire warning/alarm system, a regional security system, or a regional environmental control system all without limitation. System 12 can monitor one or more selected conditions in real-time, in a region R.

System 12 includes a control unit 12a which could be implemented at least in part with one or more programmable processors 12b and associated, executable control software 12c pre-stored on a computer readable medium. System 12 is coupled to a plurality of ambient condition detectors 14, such as smoke detectors, gas detectors, thermal detectors, or fire detectors, via one or more wired or wireless mediums 14. System 12 is also coupled to a plurality of output devices 18, such as strobes, horns, speakers, or the like, via one or more mediums 18.

System 12 can also be coupled to a local paging system 24. System 12 can broadcast various types of verbal messages into the region R via the paging system 24.

A bidirectional communications interface 30 couples communications between a telephone-type system 32, wired or wireless, and monitoring system 12. Interface 30 makes it possible for an individual in region R who detects an emergency condition to bidirectionally communicate verbally, via telephone system 32 with the monitoring system 12. Interface 30 can be implemented as a module added to system 12 or integrated into system 12.

Interface 30 includes processing circuitry 40 which includes voice coder/decoder (CODEC) circuitry. Processing circuitry 40 is coupled to a telephone system input/output port 42 via telephone system interface 44.

Processing circuitry 40 is also coupled to a monitoring system interface 46. Interface 46 communicates with system 12 via port 48.

Interface 30 can also include one or more storage units 50 as well as status indicators 52. Storage units 50 can store data and or instructions for use by circuitry 40. Status indicators 52 can be implemented as audible or visible output elements.

Figure 2:
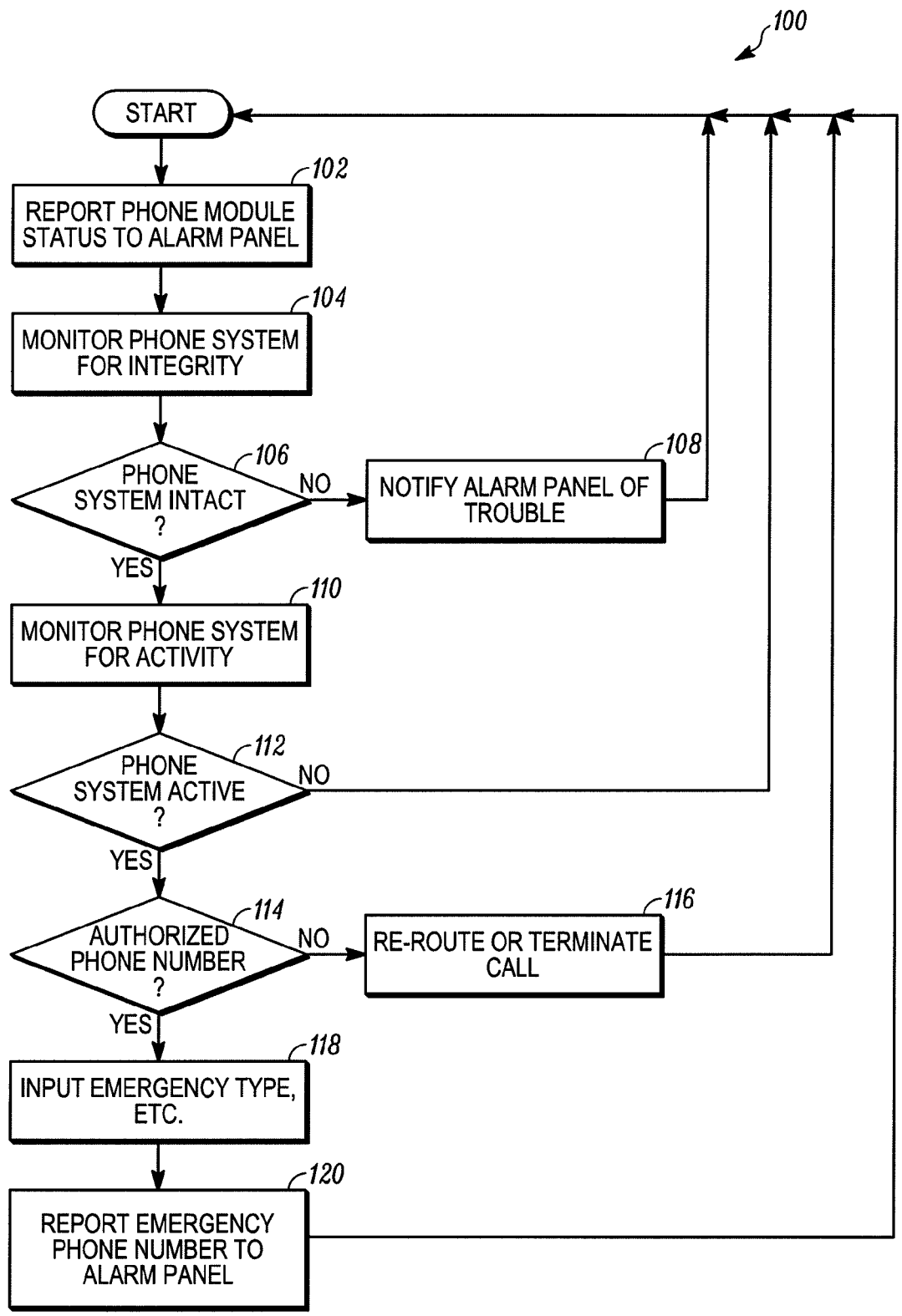
FIG. 2 is a flow diagram of a method in accordance with the invention.

Interface 30 can implement a variety of communications protocols as discussed above. FIG. 2 is a flow diagram of an exemplary process 100.

Status of the interface 30 can be reported to the monitoring system 12, as at 102. System 32 can be monitored for operational integrity as at 104.

If the phone system 32 does not appear to be functioning properly, as at 106, an appropriate message or indicium can be coupled to system 12 as at 108. Otherwise system 32 is monitored for incoming calls, as at 110.

Where a call has been received as at 112, and it is from an unauthorized source, or phone number, as at 114, that call can be re-directed or terminated as at 116. Where an authorized call has been received, as at 118, processing circuitry 40 can generate a verbal response requesting that the caller provide verbal information as to location and types of emergencies being experienced.

Received information can be forwarded to system 12, as at 120. Additional feedback can be provided from monitoring system 12 and interface 30, via system 32 as to actions to be taken such as escape routes to use and the like. Alternately system 12, in response to information received via interface 30, can use paging system 24 to broadcast verbal messages into the region R alerting individuals in the region as to the emergency and how to proceed.

It will be understood that processing 100 is exemplary only. Other communications processes come within the spirit and scope of the invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A monitoring system comprising:
a condition monitoring control unit;
a plurality of ambient condition detectors and a plurality of output devices coupled to the condition monitoring control unit; and
a communications interface coupled to the condition monitoring control unit, the communications interface having at least one input port that receives a call with incoming voice verbal communication reporting a fire, medical or other emergency through a telephone-type communications system and, reply circuitry, responsive to the incoming voice verbal communications, that automatically produced verbal reply through the telephone-type communications system, the communications interface recognizing a telephone number or extension of a source of the call and location information of the emergency from the telephone number or extension.

2. A system as in claim 1 where the interface includes speech recognition circuitry.

3. A system as in claim 1 which includes circuitry to transfer selected indicia to the monitoring-unit.

4. A system as in claim 1 where the interface includes circuitry coupled to the port that responds to at least one of wired or wireless telephone-type communications.

5. A system as in claim 4 where the interface includes additional circuitry which evaluates a received communication, and responsive thereto, determines if a representation of the communication should be transferred to the monitoring unit.

6. A system as in claim 5 where the monitoring unit includes circuitry responsive to a transferred representation.

7. A system as in claim 5 where the additional circuitry evaluates the communication to determine if the communication is from an authorized source.

8. A system as in claim 7 where, responsive to a determination that the communication is from an authorized source, the interface circuitry requests entry of a condition specifying indicium.

9. A system as in claim 8 where, responsive to receipt of the indicium, the interface transfers a representation of the indicium to the control unit.

10. A system as in claim 9 which includes a regional announcement system, coupled to the unit, with the unit including circuitry to broadcast audio announcements from the announcement system.

11. An interface comprising:
a first circuit for interfacing with a telephone-type communications system;
a second circuit for interfacing with a monitoring system;
control circuits coupled to both the first circuit and the second circuit, and responsive to a call with incoming verbal communications reporting a fire, medical or other emergency through the telephone-type communications system, including communications evaluation circuitry that recognizes a telephone number or extension of a source of the call and location information of the emergency from the telephone number or extension; and
speech production circuitry to verbally request entry of a condition specifying indicator.

12. An interface as in claim 11 which includes additional circuits to transfer at least one of source identification information, or, condition specifying information to the second circuit for interface with the monitoring system.

13. An interface as in claim 11 where the control circuits include circuits for coding and decoding speech signals.

14. An interface as in claim 11 which includes executable software, to evaluate at least in part, incoming speech.

15. An interface as in claim 11 which includes executable software to produce verbally a request to enter the condition specifying indicator via the first circuit for interfacing with the telephone-type communications system.

16. A method comprising:
condition monitoring circuitry monitoring a status of a telephone-type communications system;
if the system is in a selected state, the condition monitoring circuitry awaiting an incoming call with verbally-obtained communication through the telephone-type communications system reporting a fire, medical or other emergency;
the condition monitoring circuitry evaluating a source of the incoming verbally-obtained communication, and, if acceptable, the condition monitoring circuitry requesting entry of a condition specifying indicator;

the condition monitoring circuitry recognizing location information of the emergency based upon a source of the incoming verbally-obtained communication; and the condition monitoring circuitry forwarding information specifying the condition specifying indicator to a regional monitoring system.

17. A method as in claim 16 which includes emitting a selected warning indicator if the telephone-type communications system does not exhibit the selected state.

18. A method as in claim 17 where requesting includes generating a verbal request.

19. A method as in claim 18 which includes transmitting the generated verbal request in real-time to the source.

20. A method as in claim 19 where forwarding includes forwarding an indicator of a response from the source.

* * * * *